Figure 1:
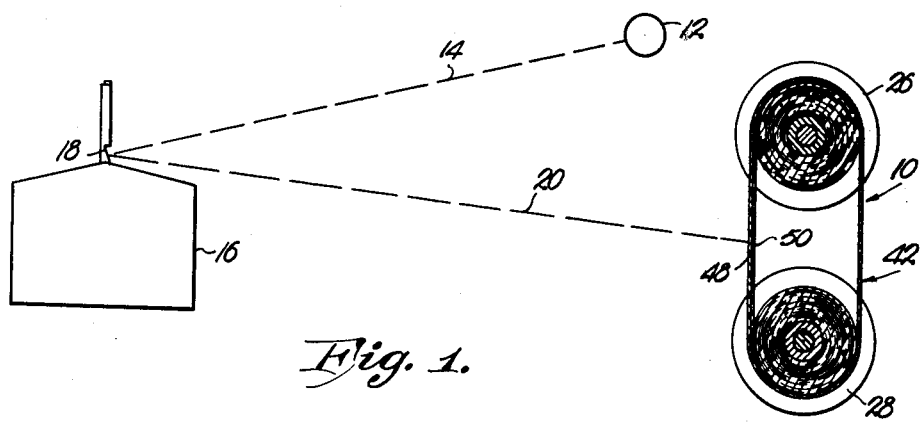

April 20, 1965   W. E. HARRISON ETAL   3,179,949
OSCILLOGRAPH UTILIZING BELT COATED WITH FLUORESCENT SUBSTANCE
Filed Aug. 27, 1962

INVENTORS.
Wayne E. Harrison
George R. Morrow
BY
Avey, Schmidt, Johnson & Novy
ATTORNEYS.

United States Patent Office 3,179,949
Patented Apr. 20, 1965

3,179,949
OSCILLOGRAPH UTILIZING BELT COATED WITH FLUORESCENT SUBSTANCE
Wayne E. Harrison and George R. Morrow, Tulsa, Okla., assignors, by mesne assignments, to Midwestern Instruments, Inc., Tulsa, Okla., a corporation of Oklahoma
Filed Aug. 27, 1962, Ser. No. 219,539
12 Claims. (Cl. 346—109)

This invention relates to an oscillograph instrument, and more particularly, to such an instrument having fluorescent means thereon for energizing the recording medium normally associated therewith.

In a conventional oscillograph instrument utilized for recording high frequency, low amplitude, electronic signals, a source of electromagnetic radiation is employed which, together with suitable collimating apparatus, directs a beam of light toward a galvanometer having beam-deflecting means thereon and coupled with an electronic signal to be measured. The beam, after being deflected by the galvanometer, is directed onto a recording medium in the nature of a traveling length of sheet material having an emulsion thereon sensitive to the radiation of the source.

It is clear, therefore, that if the source of radiation is changed, the sheet material must be replaced with another type sensitive to the radiation of the new source. Generally, ultraviolet, infrared or visible radiation is used as the source in the instrument of the type described. Other sources which may be utilized are X-radiation, cathode rays, and radiation associated with radioactive materials.

All of the aforementioned types of radiation are capable of energizing fluorescent materials to cause the latter to emit light generally in the visible portion of the electromagnetic spectrum. Based upon this fact, the present invention utilizes an attachment for an oscillograph of the type described which intercepts the beam of radiation from the source thereof and is provided with a coating of fluorescent material thereon which is energized by the beam to emit light, whereby the light is sufficient to expose the emulsion carried by a recording medium adjacent the coating of fluorescent material. By virtue of this construction, the same type of recording medium may be utilized with radiation sources emitting electromagnetic radiation at various wave lengths and with sources emitting high speed particles also capable of energizing a fluorescent material.

It is, therefore, the primary object of the present invention to provide an attachment for use on an oscillograph provided with a source of electromagnetic radiation wherein the attachment is provided with fluorescent means thereon capable of emitting light when energized by the beam from the source of radiation, whereby the light is sufficient to energize the recording medium carried by the oscillograph and the same recording medium can be utilized regardless of the type of source employed in the oscillograph itself.

Another object of the present invention is the provision of an endless, transparent, flexible belt trained over the supply and take-up reels carrying the recording medium of a conventional oscillograph with the belt in surrounding relationship to the recording medium, whereby the belt is caused to intercept the beam of radiation from the source and the fluorescent material is energized to emit light which impinges on the recording medium and thus exposes the latter as a function of the beam impingement on the belt.

Still another object of the present invention is the provision of the belt of the aforesaid character which is in juxtaposition with the portion of the recording medium between the reels and is movable therewith, whereby the recording medium is properly exposed to the light emitted by the fluorescent material notwithstanding the fact that the material phosphoresces for a limited time.

Figure 2:
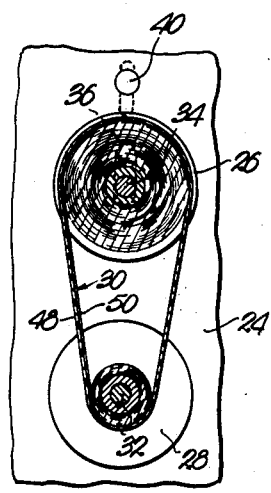
Figure 4:
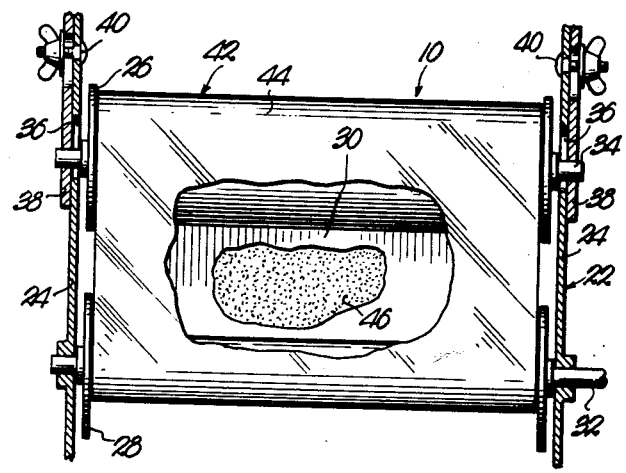
Figure 3:
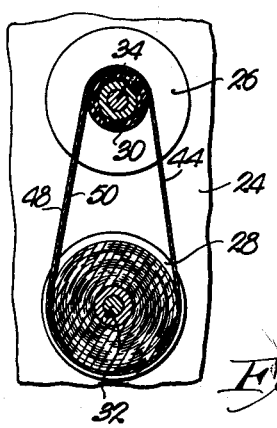
Figure 5:
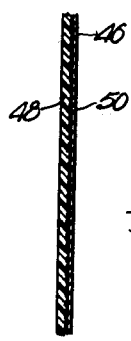

Other objects of the present invention will become apparent as the following specification progresses, reference being had to the accompanying drawing, wherein:
FIGURE 1 is a schematic view of essential elements of an oscillograph, together with the structure forming the present invention and illustrating a beam of electromagnetic radiation impinging on the endless flexible belt forming a part of the present invention;
FIG. 2 is a cross-sectional view of the present invention and illustrating the belt trained over supply and take-up reels carrying an elongated recording medium thereon, the supply reel having a greater amount of the recording medium thereon than does the take-up reel;
FIG. 3 is a view similar to the view of FIG. 2, illustrating the fact that the take-up reel is provided with a greater amount of the recording medium than is disposed on the supply reel;
FIG. 4 is a view of the present invention in side elevation, parts being broken away and in section to illustrate details of construction; and
FIG. 5 is an enlarged, fragmentary, cross-sectional view of portions of the flexible belt and the juxtaposed portion of the recording medium.

The present invention provides an attachment for a conventional oscillograph in the nature of an endless, transparent belt of plastic material which is coated on the inner surface thereof with a fluorescent material capable of emitting light when energized by electromagnetic radiation. The belt is adapted to be trained over the supply and take-up reels carrying the recording medium with the belt disposed in surrounding relationship to said recording medium. The belt is in juxtaposition with the portion of the recording medium spanning the distance between the supply and take-up reels and is disposed across the path of outward travel of the beam of radiation emitted from the oscillograph after the beam has been deflected by a corresponding galvanometer. When the fluorescent material is energized, light is emitted which exposes the emulsion on the recording medium, and the latter is thus energized as a function of the beam impinging on the belt.

The apparatus which forms the subject of the present invention is broadly denoted by the numeral 10 and, as shown schematically in FIG. 1, is to be utilized with an oscillograph having a source 12 of electromagnetic radiation which directs a beam 14, shown in dashed lines, toward a galvanometer 16 having reflecting means 18 for deflecting beam 14 along a path broadly denoted by the numeral 20 outwardly of the oscillograph. Galvanometer 16 is adapted to be operably coupled with an electronic signal so that path 20 is irregular and is a function of the amplitude of the signal itself.

Apparatus 10 includes a support 22 including a pair of sides 24 disposed for mounting a supply reel 26 and a take-up reel 28 thereon for rotation with respect to sides 24. A recording medium 30 in the nature of a length of sheet material having an emulsion on one surface thereof sensitive to light, is carried on reels 26 and 28 and normally moves from the supply reel toward and onto the take-up reel when the shaft 32 of reel 28 is driven in any suitable manner. The shaft 34 of supply reel 26 is received within slots 36 in sides 24, and a pair of plates 38 journal the ends of shaft 34 and mount the latter for shiftable movement within slots 36. Fastening means 40 interconnects each plate 38 with the corresponding side 24 to maintain the corresponding end of shaft 34 in a fixed position.

Belt structure broadly denoted by the numeral 42, is trained over reels 26 and 28 in surrounding relationship to medium 30. Structure 42 includes an endless, flexible, transparent belt 44 formed preferably from a suitable plastic material. Belt 44 is provided with a coating 46 of a fluorescent material capable of emitting light when excited by electromagnetic radiation or by high speed charged particles. Thus, structure 42 is, in effect, an energy conversion medium capable of exposing the emulsion on recording medium 30 upon excitation of coating 46.

Reels 26 and 28 are normally in positions with respect to each other such that tension is applied to belt 44 to cause the latter to move at the same rate as medium 30 when medium 30 passes from supply reel 26 toward and onto take-up reel 28. By virtue of this construction, a portion 48 of belt 44 is always in juxtaposition with a portion 50 of medium 30, as is clear in FIG. 5. As shown in FIG. 2, the supply reel 26 is provided with a greater amount of the medium 30 than is take-up reel 28. It can be seen that in this instance, portion 48 of belt 44 is maintained in juxtaposition to portion 50 with the coating 46 disposed between portions 48 and 50. Similarly, when a greater amount of medium 30 is disposed on take-up reel 28 than is disposed on supply reel 26, portion 48 still remains in substantial juxtaposition with portion 50.

It is evident that by properly positioning plates 38 with respect to sides 24, the tension on belt 44 may be varied. However, it is sufficient that the tension be only at a value whereby belt 44 travels substantially at the same rate as medium 30. The frictional force between coating 46 and medium 30 must, therefore, be sufficient to prevent slippage between belt 44 and medium 30.

In operation, apparatus 10 is disposed within the path of travel 20 of the beam 14 so that radiation from source 12 is directed onto belt 44 in the manner shown in FIG. 1. Since belt 44 is transparent, the radiation passes therethrough and onto the fluorescent coating 46. The impingement of the radiation on coating 46 is sufficient to cause coating 46 to emit light which passes onto portion 50 of medium 30, and in turn exposing the emulsion on medium 30 to the light. The fluorescent material may well have a persistence time since there is no danger of a double exposure of medium 30, especially in view of the fact that medium 30 and belt 44 travel at the same rate. The persistence of coating 46 is preferable, since the same makes it possible to monitor the record by utilizing suitable well-known viewing means.

By utilizing the construction of the present invention, the same type of recording medium may be utilized with oscillographs having differing sources of radiation. In addition, electromagnetic radiation, as well as high speed charged particles, may be utilized for exciting the fluorescent material on the inner surface of belt 44 so that light emitted by such excitation may be caused to expose medium 30 as a function of the impingement of the radiation or particles on belt 44.

Having thus described the invention, what is claimed as new and desired to be secured by Letters Patent is:

1. In an oscillograph having means for directing a beam of electromagnetic radiation along a predetermined path of travel with said radiation being capable of exciting a fluorescent material to cause the latter to emit light:
   a recording medium having an emulsion thereon sensitive to said light and adapted to be moved across the path of travel of said beam; and
   structure coated with said fluorescent material and adapted to be disposed in said path of travel and adjacent said recording medium, whereby the material on said structure is excited to cause the emission of said light to thereby expose the emulsion of said recording medium.

2. In an oscillograph having means for directing a beam of electromagnetic radiation along a predetermined path of travel with said radiation being capable of exciting a fluorescent material to cause the latter to emit light:
   a support;
   a recording medium shiftably carried by said support for movement across the path of travel of said beam, said recording medium having an emulsion thereon sensitive to said light; and
   structure mounted on said recording medium and movable therewith, said structure being coated with said fluorescent material and disposed for intercepting said beam as the latter travels toward said recording medium, whereby the material on said structure is excited to cause the emission of said light to thereby cause the exposure of said emulsion to the light.

3. In an oscillograph having means for directing a beam of electromagnetic radiation along a predetermined path of travel with said radiation being capable of exciting a fluorescent material to cause the latter to emit light:
   a support;
   a supply reel and take-up reel rotatably mounted in spaced relationship on said support;
   a recording medium normally carried by said supply reel and movable toward and about said take-up reel, said support being adapted to be positioned with said recording medium in the path of travel of said beam, said recording medium having an emulsion thereon sensitive to said light; and
   belt structure disposed over said reels adjacent said recording medium and movable with the latter, said structure being coated with said fluorescent material and disposed for intercepting said beam as the latter travels toward said recording medium, whereby the material on said structure is excited to cause the emission of said light to thereby cause the exposure of said emulsion to the light.

4. In an oscillograph as set forth in claim 3, wherein said structure is normally disposed in juxtaposition to the portion of said recording medium between said reels.

5. In an oscillograph as set forth in claim 3, wherein said structure comprises an endless, flexible belt trained over said reels in surrounding relationship to said recording medium.

6. In an oscillograph as set forth in claim 5, wherein said belt is transparent; said material being coated on the inner surface of said belt.

7. In an oscillograph as set forth in claim 5, wherein said support is provided with means for shifting one of the reels relative to the other reel, whereby tension may be applied to and removed from said belt.

8. In combination with an oscillograph having means for directing a beam of electromagnetic radiation along a predetermined path of travel with said radiation being capable of exciting a fluorescent material to cause the latter to emit light:
   a support;
   a supply reel and a take-up reel rotatably mounted in spaced relationship on said support;
   a recording medium normally carried by said supply reel and movable toward and about said take-up reel, said support being positioned with the recording medium in the path of travel of said beam, said recording medium having an emulsion thereon sensitive to said light; and
   belt structure disposed over the reels adjacent said recording medium and movable with the latter, said structure being coated with said fluorescent material and disposed for intercepting said beam as the latter travels toward said recording medium, whereby the material on said structure is excited to cause the emission of said light to thereby cause the exposure of said emulsion to the light.

9. In an oscillograph having means for directing a beam of energy along a predetermined path of travel:
a conversion medium sensitive to said energy for emitting electromagnetic radiation of a preselected wave length upon excitation by said energy;
a recording medium having an emulsion thereon sensitive to said electromagnetic radiation; and
means operably associated with both of said mediums for positioning at least a portion of the conversion medium in said path of travel in intercepting relationship to said beam, and maintaining said recording medium in disposition to directly receive the radation from said portion to thereby expose said emulsion.

10. The invention of claim 9, wherein said means mounts said mediums for movement of successive portions of said conversion medium across said path of travel and simultaneous movement of said recording medium to maintain the latter in continuous, radiation-receiving relationship with the portion of said conversion medium under energization by said beam of energy.

11. The invention of claim 10, wherein said means mounts said mediums for simultaneoeus movement with the portion of the conversion medium under excitation by said energy beam being in juxtaposition with a corresponding portion of said recording medium.

12. The invention of claim 9, wherein said conversion medium includes a fluorescent material responsive to said energy, said emulsion being sensitive to light emitted by said material upon excitation thereof.

References Cited by the Examiner
UNITED STATES PATENTS

| | | | |
|---|---|---|---|
| 2,482,813 | 9/49 | Urbach | 96—27 |
| 2,642,538 | 6/53 | Urbach | 96—27 |
| 3,063,350 | 11/62 | Le Massena | 346—109 |
| 3,064,260 | 11/63 | Heiland | 346—109 |

LEO SMILOW, *Primary Examiner.*